United States Patent Office 3,315,245
Patented Apr. 18, 1967

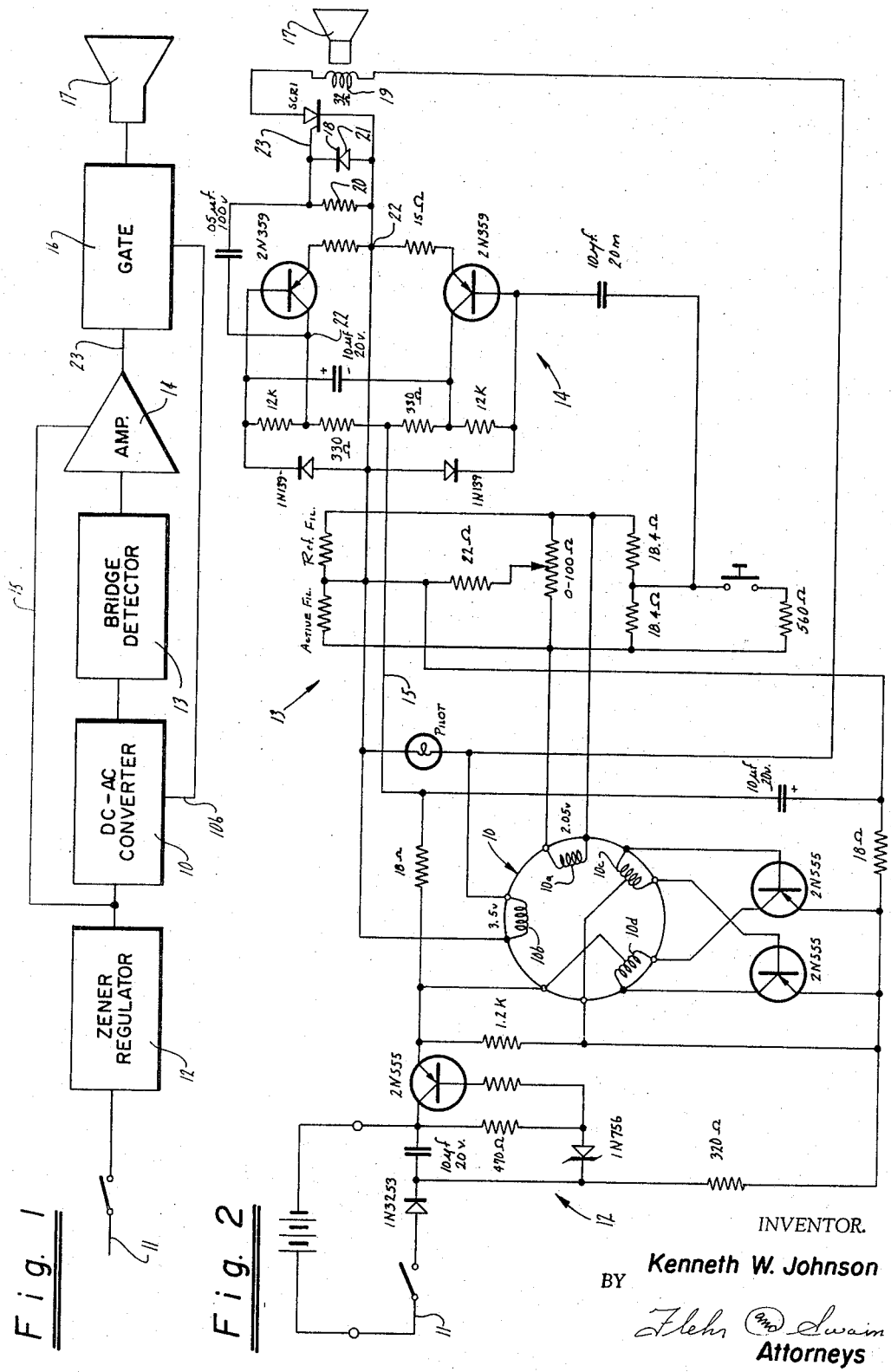

3,315,245
GAS DETECTION APPARATUS
Kenneth W. Johnson, Palo Alto, Calif., assignor to Johnson-Williams, Inc., Mountain View, Calif., a corporation of California
Filed Jan. 10, 1964, Ser. No. 336,986
1 Claim. (Cl. 340—237)

This invention relates to gas detection apparatus and more particularly to such apparatus as provides an audible alarm when the concentration of combustible gases exceeds a predetermined minimum.

Gas detecting apparatus wherein a Wheatstone bridge is employed and arranged whereby the degree of bridge unbalance caused by thermally induced variation of resistance in one arm of the bridge indicates dangerous levels of gas concentrations is shown in various prior patents, such as U. S. No. 2,786,350 and No. 2,883,270. Accordingly, it can be explained herein briefly that in so using a Wheatstone bridge to detect the presence of certain concentrations of combustible gas, combustion of a gas sample is effected in a test chamber under catalytic conditions. The combustion serves to heat a resistor incorporated in the Wheatstone bridge and thereby, to an extent represented by the combustion, serves to vary the resistance of the particular resistance element. The change in the resistance of the element or "filament" as they are generally referred to, can be sensed by suitable means, such as a meter if desired, or an alarm which is activated thereby.

Equipment according to the present invention is particularly useful in marine installations such as in pleasure boats and other small craft but will find application in vehicles, aircraft and stationary or other installations where direct current is available.

In providing gas detection equipment for installation in small craft, a number of problems have been encountered in the past. It is a general objective of this invention to provide a satisfactory remedy for these problems.

For example, because of varying load and charge rates, supply voltage taken from a battery in a boat will tend to fluctuate relatively widely as, for example, between 11 and 18 volts for a nominal 12 volt battery. However, a closely regulated voltage at the gas detection filaments is required since over voltage diminishes the life of the detection filaments and under voltage affects accuracy.

Another problem is a requirement for the detection filament of a relatively high current at low voltage, on the order, for example, of 1 ampere at 2 volts. To produce this condition directly from a 12 volt battery has, in the past, required the dissipation of about 10 watts externally of the measuring circuit. For high voltage batteries, the dissipation is even greater.

In the past, it has usually been the practice to employ D.-C. measuring circuits. In marine installations using D.-C. measuring circuits, a sensitive relay or meter relay has been characteristically required in order to actuate the alarm circuits. Such sensitive relays and meter relays are characteristically expensive and delicate devices. Employing the construction of the present invention, however, serves to eliminate the need for such sensitive meter relays.

In addition to the foregoing, in order to provide an audible alarm, some form of noise producing device such as a bell or buzzer has been conventionally employed. However, bells and buzzers include sparking contacts which will eventually get out of adjustment and thereby provide improper operation, as well as being generally undesirable from a safety standpoint.

Therefore, according to the present invention as disclosed further below, a D.-C. to A.-C. converter is employed which serves, not only to provide the A.-C. power to the filaments but also to provide a suitable audio frequency signal which provides an alarm signal frequency.

Bridge unbalance is a relative relationship. Unbalance is caused by heating a resistance element disposed in one arm of the bridge as mentioned above, to provide a relative change with respect to the resistance of other arms of the bridge. This unbalance will be in a certain phase which is characteristic of an increase in filament resistance due to heating as produced by an increase in gas concentration. Other effects can act to produce unbalance in the opposite phase. These effects including, cooling of the active filament, increase in resistance of the reference filament, various electrical faults which act to increase the resistance of the bridge elements or conductors, or manipulation of the balance control potentiometer. It is undesirable that these effects should give the same kind of response as is produced by detection of gas. Thus, a phase discriminating means is required to eliminate spurious claims from out-of-phase signals. There has been provided herein a phase sensitive device which serves to provide an alarm signal in response only to those unbalanced bridge signals of a certain predetermined amplitude having a phase representative of unbalance caused by change in impedance of the test filament so as to discriminate between conditions of unbalance caused by dangerous concentrations of combustible gases and unbalanced conditions caused by extraneous effects.

While it is a general object of the invention to provide an improved gas detecting apparatus which serves to overcome the foregoing and other problems encountered, a more particular object of the invention is the provision of a gas detecting apparatus of considerably simplified construction.

According to one aspect of the invention, an alarm signal is generated and provides an audible tone derived directly from a D.-C. to A.-C. converting means. Thus, the audible alarm signal is produced without the expense or provision of devices such as a buzzer or bell. The required transducer, which may be a moving coil loudspeaker is relatively inexpensive and trouble free.

The D.-C. to A.-C. converting means also provides requisite low voltage A.-C. power to the analyzing filaments. Use of alternating current on the filaments has the further advantage of elimination of thermal E.M.F. effects which otherwise contribute to drift and instability.

Furthermore, inasmuch as the overall current being consumed is considerably lower, it thereby becomes relatively easy to regulate a fluctuating supply voltage serving the converter and hence the output can be similarly regulated merely by using a Zener diode regulator to control the input to the converter.

The foregoing and other objects of the invention will become more readily apparent from the following detailed description of a preferred embodiment when taken in conjunction with the accompanying drawings in which:

FIGURE 1 is a block diagram representation of a gas detecting circuit according to the present invention; and FIGURE 2 is a detailed schematic circuit drawing according to the invention shown in FIGURE 1. Values of the elements employed in FIGURE 2 have been shown associated therewith whereby the circuit can be readily constructed.

In general, gas detection apparatus has been disclosed herein for sounding an alarm in response to sampling a predetermined concentration of combustible gases and adapted to be operatively coupled to a direct current supply voltage. The apparatus includes a Wheatstone bridge gas detection circuit including input and output connections and a gas detection filament disposed in one arm of the bridge. Converter means are provided which serve to convert a relatively high voltage direct current supply potential to a relatively low voltage audio frequency signal. The audio frequency signal is operatively coupled to the Wheatstone bridge via input connections thereto so as to provide low voltage A.-C. power to the filaments. The Wheatstone bridge receives the audio frequency signal and provides the same audio frequency at the output connections thereof. The Wheatstone bridge is further adapted to vary the amplitude of the audio frequency signal to reflect varying concentrations of sampled gases. Amplifying means are operatively coupled to the output connections of the Wheatstone bridge so as to amplify the audio frequency output thereof. The amplifying arrangement is disposed to transmit gating signals to a gate whenever the amplitude thereof exceeds a predetermined level. The gate then serves to pass a current from the converter to a speaker upon receipt of the gating signal.

Inasmuch as D.-C. power supplies such as are employed in small craft frequently fluctuate over a relatively wide range, the utilization of the D.-C. to A.-C. converter means permits close regulation of voltage at the filaments to be accomplished by including a Zener diode operatively coupled to the input of the converter means so as to regulate the voltage output thereof supplied to the Wheatstone bridge.

According to a particular preferred embodiment, where the amplifier means serves to amplify output signals of the Wheatstone bridge indiscriminately with respect to the phase so as to otherwise possibly render a spurious response, the gate acts as a phase sensitive device serving to allow current to be transmitted from the converter to the loudspeaker only when the amplifier output signal is of a predetermined phase. As will be shown further below, a silicon controlled rectifier employing a gate electrode coupled to respond only to a predetermined phase of the signal transmitted by the Wheatstone bridge, is particularly satisfactory.

Having in mind the foregoing and with reference to the block diagram shown in FIGURE 1, the converting means serving to convert a D.-C. supply to an A.-C. signal is shown by the box identified by reference numeral 10. D.-C. power received on line 11 through an on-off switch is fed to converter 10 through a Zener regulator 12 which serves to hold the input voltage substantially constant by means of a Zener diode and transistor arrangement. Current is relatively low and, therefore, easier to regulate since regulation is obtained substantially in effect by working on the primary side of a step-down transformer.

A.-C. output 10a from the converter to the bridge is at a relatively low value, such as 2 volts and this output is fed to a substantially conventional Wheatstone bridge detecting circuit 13. As is known, such Wheatstone bridge detecting circuits include a zero adjuster and a test switch or the like and resistors which serve to unbalance the bridge by a known amount when making adjustments. Utilization of alternating current on the filaments eliminates thermal E.M.F. effects, which is known to be one cause of instability and drift in such devices.

The alternating current signal from the converter 10 is an audio frequency signal whereby the output of bridge detector circuit 13 is also an audio frequency signal. This audio frequency is amplified by a suitable transistor amplifier 14 maintained properly biased by D.-C. supply voltage on line 15. This arrangement has the advantage of not being particularly susceptible to drift and temperature sensitivity problems as would be found, for example, in D.-C. amplifiers. Accordingly, additional benefit is gained from the use of the D.-C. to A.-C. conversion means inasmuch as A.-C. amplifiers generally can be made of very simple design without losing their stability.

The converter 10 includes an additional output 10b which serves to apply current through a gate 16 to the speaker 17. The outputs 10a and 10b are in phase such that the current applied to the bridge 13 and the gate 16 are in phase. The phase of the bridge output, however, varies dependent upon the presence of gas on the detection filament. With the presence of a combustible gas on the detection filament the bridge output is also in phase with the output 10b.

The output of the bridge is applied to the amplifier 14 whose output is applied as a gating input to the gate 16. As seen in FIGURE 2 the gate 16 is in the form of a silicon controlled rectifier. The silicon controlled rectifier, in addition to acting as a phase sensitive device, also serves as a threshold device whereby current from the converter output 10b is applied to a speaker 17 only when the bridge and amplifier output reaches a predetermined minimum. This predetermined minimum establishes the alarm setting level.

As will be apparent from the foregoing description, the frequency of the A.-C. converter means 10 is established to provide an audio signal and preferably as in the region of 500 to 100 cycles per second. This provides a favorable range for the converter, the amplifier and the human ear. Accordingly, this same frequency is subsequently used to actuate the speaker directly without need for auxiliary noise-making devices. The construction referred to above provides a relatively trouble-free construction which is not particularly critical with regard to voltage and temperature variations as might be found in small craft operation. Furthermore, the construction lends itself to a rugged and compact construction. Use of the same A.-C. power source to produce both the alarm signal when the amplitude reaches a critical level, as well as to produce the power for the filaments, serves to provide further simplification of the circuitry and construction thereby providing substantially maintenance-free operation.

In FIGURE 2, there is shown a schematic wiring arrangement with values of the various elements associated therewith. With respect to the preferred construction shown in FIGURE 2, transistor type numbers have also been shown in the drawing as well as other identifying information. The signal amplifier, for example, consists of an audio frequency amplifier with an input of 0–50 millivolts and an output of 0–1 volt at saturation Because of requirements in simplicity and transistors, a two stage capacitance coupled self-biased and negative feedback circuit is utilized. A pair of medium power p-n-p transistors are used and can be the 2N359 type shown. The total amount of power consumed by the amplifier is on the order of 9 volts and 40 milliamps.

A silicon controlled rectifier 16 is disposed in series with the coil 19 of a signal transducer such as a 2½ inch loudspeaker. The gating input voltage to the phase sensitive silicon controlled rectifier 16 will range up to about 1 volt at which time it will begin to conduct. Accordingly, it also acts as a threshold device to establish the minimum conduction level. The amplified output is taken from junction point 22 and is developed across resistor 20 which is coupled directly to the gate by line 23. Diode 21 is used to shunt the unwanted phase signal.

A suitable D.-C. to A.-C. converter can be of the toroid type shown in FIGURE 2. One such converter may be wound upon a toroid Model No. 3T5651–D2, as manufactured by Arnold Engineering Company of Marengo, Illinois. Winding 10a and 10b include 11 and 19 turns respectively, while the remaining winding, used for the oscillation portion are 28 turns on 10c and 84 turns on 10d. The transistors employed are type 2N555.

While the foregoing description has been directed to the detection of combustible gases, it should be apparent that other gases may be likewise detected. An example would be gases which vary in thermal conductivity which could also change the filament temperature.

I claim:

In gas detection apparatus for providing an alarm in response to sampling a predetermined concentration of gas wherein the detection apparatus is adapted to be operatively coupled to a direct current supply voltage, apparatus comprising a Wheatstone bridge gas detection circuit including input and output connections and a gas detection filament disposed in one arm of said bridge, converter means serving to convert a direct current supply potential to an audio frequency signal, said signal being operatively coupled to said Wheatstone bridge via the input connections thereto to provide A.-C. power to said filament, said Wheatstone bridge being coupled to receive said audio frequency via said input connections and to provide said audio frequency at said output connections thereof, said Wheatstone bridge being adapted to vary the amplitude of said audio frequency signal at the output connections thereof responsive to varying concentrations of sampled gases, transducer means including a loudspeaker coupled to directly receive said audio frequency signals from said converter for providing an alarm signal, amplitude threshold sensing means serving to sense a predetermined minimum output of said audio frequency signals from said bridge and responsive to sensing said minimum output to gate the output audio frequency signals to said loudspeaker to operate same in response thereto.

References Cited by the Examiner
UNITED STATES PATENTS

| | | |
|---|---|---|
| 1,870,181 | 8/1932 | Mallory. |
| 2,916,358 | 12/1959 | Valentine et al. _____ 23—254 |
| 3,040,157 | 6/1962 | Hukee _____ 340—233 |
| 3,047,847 | 7/1962 | Marsh et al. _____ 324—71 X |
| 3,196,357 | 7/1965 | Hoag _____ 340—249 X |
| 3,214,668 | 10/1965 | Brinster _____ 323—22 |
| 3,221,320 | 11/1965 | Yoneda _____ 340—237 |

NEIL C. READ, *Primary Examiner.*

D. K. MYER, *Assistant Examiner.*